United States Patent
Lovette et al.

(10) Patent No.: US 9,695,266 B2
(45) Date of Patent: Jul. 4, 2017

(54) WETTABLE, HIGH STRENGTH FOAM ESPECIALLY FOR INK HOLDERS

(71) Applicants: Joseph W. Lovette, Earleville, MD (US); Saranya Maungnoi, Surat Thani (TH)

(72) Inventors: Joseph W. Lovette, Earleville, MD (US); Saranya Maungnoi, Surat Thani (TH)

(73) Assignee: Foamtec International Co., Ltd., Oceanside, CA (US)

( * ) Notice: Subject to any disclaimer, the term of this patent is extended or adjusted under 35 U.S.C. 154(b) by 0 days.

(21) Appl. No.: 13/786,596

(22) Filed: Mar. 6, 2013

(65) Prior Publication Data
US 2014/0256838 A1   Sep. 11, 2014

(51) Int. Cl.
| | |
|---|---|
| C08G 18/09 | (2006.01) |
| C08G 18/48 | (2006.01) |
| C08G 18/76 | (2006.01) |
| C08G 18/10 | (2006.01) |
| C08G 18/08 | (2006.01) |
| C08G 101/00 | (2006.01) |

(52) U.S. Cl.
CPC ............ *C08G 18/14* (2013.01); *C08G 18/10* (2013.01); *C08G 18/4833* (2013.01); *C08G 18/7621* (2013.01); *C08G 2101/005* (2013.01); *C08G 2101/0008* (2013.01); *C08G 2101/0083* (2013.01)

(58) Field of Classification Search
CPC ..... C08G 18/14; C08G 18/10; C08G 18/7621
USPC ......................................................... 521/159
See application file for complete search history.

(56) References Cited

U.S. PATENT DOCUMENTS

| | | | | |
|---|---|---|---|---|
| 2,726,219 | A * | 12/1955 | Hill, Jr. .......................... 521/159 |
| 3,993,833 | A | 11/1976 | Esmay | |
| 4,888,365 | A * | 12/1989 | Riley et al. .................... 521/157 |
| 5,240,635 | A * | 8/1993 | DeGenova et al. ...... 252/182.21 |
| 5,494,941 | A * | 2/1996 | Lutter .................... C08G 18/12 521/159 |
| 6,045,741 | A * | 4/2000 | Kinoshita et al. ............. 264/321 |
| 6,458,861 | B1 * | 10/2002 | Younes .......................... 521/130 |
| 6,503,993 | B1 | 1/2003 | Huovinen et al. | |
| 6,841,586 | B2 | 1/2005 | Free et al. | |
| 2004/0044092 | A1 | 3/2004 | Noda | |
| 2005/0277703 | A1 | 12/2005 | Lovette | |
| 2010/0266799 | A1 | 10/2010 | Koonce | |
| 2011/0054108 | A1 | 3/2011 | Brown et al. | |
| 2011/0086215 | A1 * | 4/2011 | Casati et al. ................ 428/304.4 |

OTHER PUBLICATIONS

International Search Report and Written Opinion from related PCT Application No. PCT/US2014/021367 mailed on Jun. 13, 2014.

* cited by examiner

*Primary Examiner* — Melissa Rioja
(74) *Attorney, Agent, or Firm* — Zeman-Mullen & Ford, LLP

(57) ABSTRACT

A wettable, high strength, ether foam, particularly suited for ink holders, that includes a prepolymer that is formed before adding it to other components in the foam formulation.

11 Claims, No Drawings

WETTABLE, HIGH STRENGTH FOAM ESPECIALLY FOR INK HOLDERS

FIELD OF INVENTION

The present invention generally relates to a free rise, wettable, high strength, ether foam material that has improved stiffness, particularly for ink holders, in combination with improved strength properties. More particularly, the present invention relates to a free rise, wettable, high strength, ether foam, which functions particularly well for ink holders, that includes a prepolymer that is made of a polyol, an isocyanate, and a metal catalyst, where the prepolymer is formed prior to combining (foaming) it with one or more polyols, an isocyanate, and a wetting additive.

BACKGROUND OF THE INVENTION

Ink-jet cartridges used in printers with ink jet systems typically have an ink holder inside an ink storing container for holding the ink. Reticulated polyurethane foam has been used for years in ink-jet cartridges for ink holders to control the back pressure and/or regulate the ink flow to the print nozzles. It is well known in the art that controlling the foam pore size and compression ratio of the foam allows the back pressure (i.e. capillarity) to be tailored to the specific application for which the foam is being used. Typical reticulated urethane foam has a void volume of 97% which enables it to fill an entire ink cartridge while occupying only 3% of the volume. However, despite the advantages of using reticulated polyurethane foam in ink jet applications, there are some drawbacks.

First, the correct stiffness for the foam is hard to obtain. Ink jet cartridges are assembled on automated lines where the foam part comprising the ink holder has to be very quickly and mechanically stuffed or inserted into the ink cartridge. Some ink cartridge designs are not uniformly shaped and can have tapered walls. If the foam does not have the correct stiffness or integral strength it will deform and any deformation in the foam part can cause failure in its ability to perform. In addition, if the foam is too stiff, it will be more difficult, and require more force, to insert.

Second, the foam needs to wet-out rapidly and polyether urethane foams are inherently hydrophobic. Once the ink cartridge has been fitted with the foam part that comprises the ink holder, it moves to an automated ink fill station where the ink is injected into the foam ink holder contained within the ink cartridge. The ink is injected into the foam ink holder at a very high rate; it is typically injected in a matter of seconds. Despite the hydrophobic nature of the foam, it needs to wet-out rapidly to allow for rapid and complete uptake of the ink in order to completely fill the ink holder with ink.

These drawbacks or problems are experienced with standard polyether urethane foams that are used in ink jet applications as well as other applications. Accordingly, there is a need for a wettable, high strength foam material that has an ideal amount of stiffness and modulus (defined by Young's Modulus), depending on the application, without losing its strength properties.

SUMMARY OF THE INVENTION

The present invention is directed toward a wettable, high strength, foam ink holder which includes a prepolymer that is formed first and then added to at least one polyol, an isocyanate, and a wetting additive. The prepolymer is a modified isocyanate that includes a polyol, an isocyanate, and a metal catalyst. In one exemplary embodiment, the polyol used in the prepolymer is a polypropylene glycol, and the isocyanate used in the prepolymer and in the foam formulation which includes the prepolymer is a toluene diisocyanate.

In another exemplary embodiment of the wettable, high strength, foam ink holder, the prepolymer is about 5 to 75 parts per hundred based on the weight of all polyols. In addition, the amount of the wetting additive in the wettable, high strength, foam ink holder is about 0.2 to 5.0 parts per hundred based on the weight of all polyols.

The wettable, high strength, foam ink holder of the present invention is able to possess a specific stiffness of equal to or greater than 10.5 while still maintaining or improving its strength properties. For example, the wettable, high strength, foam ink holder of the present invention can possess a tensile strength equal to or greater than 32.6 psi and a tear strength equal to or greater than 3.4 psi. In addition, the wettable, high strength, foam ink holder can have a modulus of elasticity equal to or greater than 13.4 psi.

In yet another exemplary embodiment of the wettable, high strength, foam ink holder of the present invention, the prepolymer may include about 30 to 45 parts by weight polyol, about 55 to 65 parts by weight isocyanate, and about 0.01 to 0.15 parts by weight metal catalyst. In still another exemplary embodiment of the wettable, high strength, foam ink holder of the present invention, the prepolymer may include about 40.03 parts by weight polypropylene glycol, about 59.92 parts by weight toluene diisocyanate, and about 0.05 parts by weight metal catalyst. Further, the prepolymer used in the wettable, high strength, foam ink holder may have a % NCO of about 21.7.

The wettable, high strength, foam ink holder of the present invention is also highly wettable in addition to possessing a specific stiffness that is particularly advantageous for ink holders. For example, the foam ink holder of the present invention can absorb a drop of water placed on its surface within about 104 seconds or less and it can also absorb a drop of 10% isopropyl alcohol in water placed on its surface within about 5.1 seconds or less.

The present invention is also directed to a wettable, high strength, ether foam that can be used for a variety of applications where a specific stiffness of the foam is required while still maintaining or improving the strength properties of the foam, and where the foam needs to be highly wettable for retaining a liquid. For example, one such application is the wettable foam used for storing and transferring liquids as in liquid applicators and stamp pads. In one exemplary embodiment, the wettable, high strength, ether foam includes a prepolymer that is a modified isocyanate that includes a polyol, an isocyanate, and a metal catalyst where the prepolymer is formed before adding at least one polyol, an isocyanate, and a wetting additive. In one exemplary embodiment of the wettable, high strength, ether foam, the polyol used in the prepolymer is a polypropylene glycol, and the isocyanate used in the prepolymer and in the foam formulation which includes the prepolymer is a toluene diisocyanate.

In another exemplary embodiment of the wettable, high strength, ether foam, the prepolymer is about 25 to 75 parts per hundred based on the weight of all polyols. In addition, the amount of the wetting additive in the wettable, high strength, ether foam is about 5 part per hundred based on the weight of all polyols.

The wettable, high strength, ether foam of the present invention is able to possess a specific stiffness of equal to or greater than 10.5 while still maintaining or improving its strength properties. For example, the wettable, high strength, ether foam of the present invention can possess a tensile strength equal to or greater than 32.6 psi and a tear strength equal to or greater than 3.4 psi. In addition, the wettable, high strength, ether foam can have a modulus of elasticity equal to or greater than 13.4 psi.

In yet another exemplary embodiment of the wettable, high strength, ether foam of the present invention, the prepolymer may include about 30 to 45 parts by weight polyol, about 55 to 65 parts by weight isocyanate, and about 0.01 to 0.15 parts by weight metal catalyst. In still another exemplary embodiment of the wettable, high strength, ether foam of the present invention, the prepolymer may include about 40.03 parts by weight polypropylene glycol, about 59.92 parts by weight toluene diisocyanate, and about 0.05 parts by weight metal catalyst. Further, the prepolymer used in the wettable, high strength, ether foam may have a % NCO of about 21.7.

The wettable, high strength, ether foam of the present invention is also highly wettable in addition to possessing a specific stiffness that is particularly advantageous for ink holders. For example, the ether foam of the present invention can absorb a drop of water placed on its surface within about 104 seconds or less and it can also absorb a drop of 10% isopropyl alcohol in water placed on its surface within about 5.1 seconds or less.

The present invention is also directed to a method for making a wettable, high strength, ether foam that can be used in many applications including ink jet holders. The method for making a wettable, high strength, ether foam of the present invention includes the step of first forming a prepolymer that is a modified isocyanate which includes a polyol, an isocyanate, and a metal catalyst, and the step of then combining the prepolymer with at least one polyol, an isocyanate, and a wetting additive. The step of first forming a prepolymer may comprise the step of reacting an isocyanate with a polyol and a metal catalyst in a reaction chamber to form a liquid and allowing it to cool. The step of adding the prepolymer may comprise the step of using the mixhead of a foam machine to simultaneously mix pumped quantities of the prepolymer, at least one polyol, and a wetting additive to form a foam. The method for making a wettable, high strength, ether foam of the present invention may also include the additional step of felting the foam (by applying pressure and temperature to the foam).

DETAILED DESCRIPTION OF EXEMPLARY EMBODIMENTS

The present invention is directed to a wettable, high strength, foam ink holder and a wettable, high strength, ether foam that includes a prepolymer which is formed first and then added to at least one polyol, an isocyanate, and a wetting additive. The prepolymer is a modified isocyanate that includes a polyol, an isocyanate, and a metal catalyst. The polyol that is used to form the prepolymer should preferably'have an average molecular weight of about 40 to 1000 and a functionality of about 1.5 to 6 and, in one exemplary embodiment, has a molecular weight of about 700 and a functionality of about 3. Examples of polyols that can be used to form the prepolymer include, but are not limited to, polyether polyols, polyester polyols, polyester-polyether polyols, and other modified polyols or isocyanates. In addition, the polyol may include any active hydroxyl containing compounds such as glycols and amines. In one exemplary embodiment, the polyol used to form the prepolymer is polyethylene glycol such as the one commercially available as "FX31-240" from Huntsman Holland.

Examples of isocyanates that can be used to form the prepolymer may include, but are not limited to, toluene diisocyanate, methylene diphenyl diisocyanate (MDI), diphenylmethane diisocyanate, tripheny diisocyanate, xylene diisocyanate, polymethylene polyphenylene polyisocyanate, hexamethylene diisocyanate, and isophorone diisocyanate. In one exemplary embodiment, the isocyanate used to form the prepolymer is a toluene diisocyanate such as the one known commercially as "TDI-65" from Mitsui Chemicals, Inc.

The metal catalyst used to form the prepolymer may include, but is not limited to, an organotin catalyst such as a bismuth neodecanoate such as Cascat 83 or a dibutyltin dilaurate such as Cotin 200, both from Cosan Chemical. In one exemplary embodiment the metal catalyst used to form the prepolymer is an organotin catalyst such as the one commercially known as "K-29" from Evonik Industries.

The prepolymer is formed first before adding it to other components to make the wettable, high strength, foam ink holder of the present invention. The prepolymer may be formed by reacting the isocyanate with the polyol and the metal catalyst in a reaction chamber to form a liquid and then allowing it to cool. The prepolymer may be made with about 35 to 45 percent weight polyol, about 55 to 65 percent weight isocyanate, and about 0.01 to 0.15 percent weight metal catalyst. In one exemplary embodiment, the prepolymer includes 40.03 percent weight polypropylene glycol, 59.92 percent weight toluene diisocyanate, and 0.05 percent weight organotin catalyst.

The prepolymer is formed and then combined with other components which include at least one polyol, an isocyanate, and a wetting additive. The polyols used in the foam formulation which includes the prepolymer may include, but are not limited to, polyether polyols, polyester polyols, polyester-polyether polyols, graft polyols, and other modified polyols. The polyols that are used preferably have a molecular weight of about 2,000 to 10,000. In one exemplary embodiment, the polyols used include a 3000 molecular weight triol such as the one commercially known as "SC 56-16" from Shell Chemicals and a 3000 molecular weight co-polymer polyol such as the one commercially known as "HS-100" from Bayer Material Science.

Examples of the isocyanate that can be used in the foam formulation which includes the prepolymer include, but are not limited to, toluene diisocyanate, diphenylmethane diisocyanate, tripheny diisocyanate, xylene diisocyanate, polymethylene polyphenylene polyisocyanate, hexamethylene diisocyanate, and isophorone diisocyanate. In one exemplary embodiment, the isocyanate used in the foam formulation that includes the prepolymer is a toluene diisocyanate such as the one known commercially as "TDI-80" from Mitsui Chemicals, Inc.

The wetting additive that may be used in the foam formulation which includes the prepolymer may include, but is not limited to, anionic, nonionic, and cationic surfactants and mixtures thereof. In one exemplary embodiment, the wetting additive used in the foam formulation that includes the prepolymer is a proprietary surfactant such as the one known commercially as "ORTEGAL HPH1" from Evonik Industries.

Table 1 shows the prepolymer formulation that was used to form the foam ink holders in Examples 1, 2, and 3 listed in Table 2. The resulting foam ink holder preferably has a density of about 1.0 lbs./cubic ft. to 3.0 lbs./cubic ft.

TABLE 1

| Component | Percent Weight | Supplier |
|---|---|---|
| FX31-240 | 40.03 | Huntsman Holland |
| TDI-65 | 59.92 | Mitsui Chemicals, Inc |
| K-29 | 0.05 | Evonik Industries |

*Free NCO = 21.7

Table 2 shows the formulations that were used to create three examples (Examples 1,2,3) of foam ink holders where the formulation for these examples included the formed prepolymer. Table 2 also shows the formulation for an example (B) of a foam ink holder that was formed without using the prepolymer but instead included the polyol (namely the polypropylene glycol) that was used in the prepolymer in an unreacted state. Table 2 also includes a control example (A) of a foam ink holder that was formed with a standard ether foam formulation. Note that amounts of components are in parts per hundred of all polyols.

TABLE 2

| Component | A | B | 1 | 2 | 3 |
|---|---|---|---|---|---|
| SC 56-16 | 100.0 | 62.0 | 72.0 | 62.0 | 52.0 |
| HS-100 | 0 | 18.0 | 18.0 | 18.0 | 18.0 |
| FX31-240 | 0 | 20.0 | 0 | 0 | 0 |
| Prepolymer | 0 | 0 | 25.0 | 50.0 | 75.0 |
| Water | 4.70 | 4.60 | 4.90 | 5.0 | 5.4 |
| TD-65 | 0 | 30.0 | 0 | 0 | 0 |
| TDI-80 | 62.5 | 41.0 | 55.4 | 45.1 | 37.6 |
| A-1 | 0.25 | 0.25 | 0.20 | 0.20 | 0.28 |
| L-620 | 1.0 | 1.0 | 1.0 | 1.0 | 1.0 |
| Ortegol HPH1 | — | 5.0 | 5.0 | 5.0 | 5.0 |
| K-29 | 0.12 | 0.23 | 0.18 | 0.13 | 0.1 |
| Index | 120 | 120 | 120 | 120 | 120 |

Table 3 shows the physical properties of the foam ink holders that were made with the formulations shown in Table 2.

TABLE 3

| Physical properties | A | B | 1 | 2 | 3 |
|---|---|---|---|---|---|
| Density | 1.31 | 1.30 | 1.28 | 1.32 | 1.36 |
| Pore Size (RAM) | 76 | 79 | 78 | 78 | 72 |
| Pore Size (Pressure Drop) | 84 | 71 | 76 | 75 | 75 |
| CLD@25% | 0.41 | 0.31 | 0.42 | 0.60 | 0.74 |
| CLD@65% | 0.83 | 0.72 | 0.87 | 1.30 | 1.96 |
| Tensile strength | 13.2 | 20.6 | 32.6 | 38.7 | 40.7 |
| Elongation | 206 | 202 | 243 | 200 | 163 |
| Tear strength | 2.7 | 2.8 | 3.4 | 4.2 | 4.5 |
| Modulus | 6.4 | 10.2 | 13.4 | 19.4 | 25.0 |
| Specific Stiffness | 4.9 | 7.9 | 10.5 | 14.7 | 18.4 |

Note:
The water level and catalysis was varied to keep the resulting foam densities as close to 1.3 lb/cubic foot as possible.

As can be seen in Table 3, the foam ink holders made in accordance with the present invention using a prepolymer have an increased specific stiffness in comparison to the foam ink holder control example and the foam ink holder made with an unreacted polyol that was used to form the prepolymer. In addition to the increased specific stiffness, the foam ink holders made with the prepolymer have increased strength properties in comparison to the foam ink holder control example and the foam ink holder made with an unreacted polyol that was used to form the prepolymer.

Table 4 shows test results for wetting where a drop of test fluid was placed on the foam ink holder and the time for it to absorb into the surface of the foam was recorded. An eyedropper was used to perform the tests and the results shown are the average of three tests per sample.

TABLE 4

| Wetting test result | A | B | 1 | 2 | 3 |
|---|---|---|---|---|---|
| Felt Firmness | 5 | 5 | 5 | 5 | 5 |
| Test with water | >10 min | 3 sec | 38 sec | 88 sec | 104 sec |
| Test with 10% IPA In water | >10 min | Instant | 1.4 sec | 1.8 sec | 5.1 sec |

As can be seen from the results, the wetting time for the foam ink holders made with the prepolymer in accordance with the present invention are superior to the foam ink holder control. Further, although the wetting time for them is not as fast as the foam ink holder made with an unreacted polyol that was used to form the prepolymer, the foam ink holder made with an unreacted polyol that was used to form the prepolymer does not exhibit the increased specific stiffness and strength properties that the foam ink holders made with the prepolymer possess.

The detailed description of the invention herein shows various exemplary embodiments and the best modes, known to the inventor at this time, of the invention. These exemplary embodiments and modes are described in sufficient detail to enable those skilled in the art to practice the invention and are not intended to limit the scope, applicability, or configuration of the invention in any way. Rather, the following disclosure is intended to teach both the implementation of the exemplary embodiments and modes and any equivalent modes or embodiments that are known or obvious to those reasonably skilled in the art. Additionally, all included examples are non-limiting illustrations of the exemplary embodiments and modes, which similarly avail themselves to any equivalent modes or embodiments that are known or obvious to those reasonably skilled in the art.

Other combinations and/or modifications of structures, arrangements, applications, proportions, elements, materials, or components used in the practice of the instant invention, in addition to those not specifically recited, can be varied or otherwise particularly adapted to specific environments, manufacturing specifications, design parameters, or other operating requirements without departing from the scope of the instant invention and are intended to be included in this disclosure.

Unless specifically noted, it is the Applicant's intent that the words and phrases in the specification and the claims be given the commonly accepted generic meaning or an ordinary and accustomed meaning used by those of ordinary skill in the applicable arts. In the instance where these meanings differ, the words and phrases in the specification and the claims should be given the broadest possible, generic meaning. If any other special meaning is intended for any word or phrase, the specification will clearly state and define the special meaning.

The invention claimed is:

1. A wettable, high strength, foam ink holder comprising a reaction product of:
   a prepolymer that is a modified isocyanate which is prepared from a composition of a polyol comprised of as polyethylene glycol, an isocyanate comprised of a toluene diisocyanate, and a metal catalyst;
   polyol component comprising at least one polyol;
   an isocyanate; and
   a wetting additive;

wherein the pre-polymer is formed prior to combining it with said polyol component, said isocyanate, and said wetting additive, and wherein an amount of the prepolymer is about 5 to 75 parts per hundred based on weight of said polyol component.

2. The wettable, high strength, foam ink holder of claim 1 wherein the amount of the wetting additive is about 0.2 to 5.0 parts per hundred based on weight of said polyol component.

3. The wettable, high strength, foam ink holder of claim 1 wherein the foam ink holder has a tensile strength equal to or greater than 32.6 psi.

4. The wettable, high strength, loam ink holder of claim 1 wherein the foam ink holder has a tear strength equal to or greater than 3.4 psi.

5. The wettable, high strength, foam ink holder of claim 1 wherein the foam ink holder has a modulus of elasticity equal to or greater than 13.4.

6. The wettable, high strength, foam ink holder of claim 1 wherein the foam ink holder has a specific stiffness equal to or greater than 10.5.

7. The wettable, high strength, foam ink holder of claim 1 wherein the prepolymer is prepared from a composition of about 30 to 45 percent weight polyethylene glycol, about 55 to 65 percent weight toluene diisocyanate, and about 0.01 to 0.15 percent weight metal catalyst.

8. The wettable, high strength, foam ink holder of claim 1 wherein the prepolymer has a % NCO content of about 21.7.

9. The wettable, high strength, foam ink holder of claim 1 wherein the foam ink holder has a density of about 1.0 lbs./cubic ft. to 3.0 lbs./cubic ft.

10. The wettable, high strength, foam ink holder of claim 1 wherein the foam ink holder can absorb a drop of water placed on its surface within 104 seconds or less.

11. The wettable, high strength, foam ink holder of claim 1 wherein the foam ink holder has a specific fitness equal to or greater than 10.5 and the foam ink holder can absorb a drop of 10% isopropyl alcohol in water placed on its surface within 5.1 seconds or less.

* * * * *